(12) United States Patent
Joye et al.

(10) Patent No.: US 7,113,595 B2
(45) Date of Patent: Sep. 26, 2006

(54) GENERATION OF A RANDOM NUMBER THAT IS NON-DIVISIBLE BY A SET OF PRIME NUMBERS

(75) Inventors: Marc Joye, Saint Zacharie (FR); Pascal Paillier, Paris (FR)

(73) Assignee: Gemplus, Gemenos Cedex (FR)

( * ) Notice: Subject to any disclaimer, the term of this patent is extended or adjusted under 35 U.S.C. 154(b) by 841 days.

(21) Appl. No.: 10/214,753

(22) Filed: Aug. 9, 2002

(65) Prior Publication Data

US 2004/0028223 A1    Feb. 12, 2004

(51) Int. Cl.
*H04L 9/22* (2006.01)
*H04L 9/00* (2006.01)
*H04L 9/30* (2006.01)

(52) U.S. Cl. ............................ 380/30; 380/28; 380/268; 380/44

(58) Field of Classification Search ................. 380/268
See application file for complete search history.

(56) References Cited

U.S. PATENT DOCUMENTS

2001/0036267 A1* 11/2001 Paillier ........................ 380/44

FOREIGN PATENT DOCUMENTS

WO        02/05483 A1    1/2002

OTHER PUBLICATIONS

Davenport, J. H., "Primality Testing Revisited"; Aug. 1992, ACM Press; Papers from the international symposium on Symbolic and algebraic computation, pp. 123-129.*
Catalano et al, "Cryptosystems: Paillier's cryptosystem revisited"; Nov. 2001, ACM Press; Proceedings of the 8th ACM conference on Computer and Communications Security, pp. 206-214.*
Paillier, U.S. Appl. No. 09/818,658, filed Mar. 28, 2001.
John B. Friedlander et al., "Small Values of the Carmichael Function and Cryptographic Applications", pp. 1-8.
Fischer Harald et al., "Power Permutations on Prime Residue Classes", pp. 191-197.

* cited by examiner

Primary Examiner—Jacques H. Louis-Jacques
Assistant Examiner—Thomas Szymanski
(74) Attorney, Agent, or Firm—Buchanan Ingersoll & Rooney PC

(57) ABSTRACT

A random number that is co-prime with a set of prime numbers is generated, without having to calculate the greatest common denominator of the numbers. The value of $1-x^\lambda (\bmod \pi)$, where x is a randomly generated value and $\lambda$ is the Carmichael function, is tested to determine whether it is non-zero. If it equals zero, x is chosen as the random number of interest. Otherwise the value for x is updated, and the procedure is repeated. Due to the minimal amount of computation resources required to select x, the process is particularly well suited for generating cryptographic keys in portable electronic devices, such as smart cards.

15 Claims, 3 Drawing Sheets

US 7,113,595 B2

GENERATION OF A RANDOM NUMBER THAT IS NON-DIVISIBLE BY A SET OF PRIME NUMBERS

FIELD OF THE INVENTION

The present invention relates to the generation of electronic keys for use in public key cryptography, and more particularly to the generation of a random number, for use in constructing such keys, that is particularly well-suited for an environment having limited processing resources, such as a portable electronic device.

BACKGROUND OF THE INVENTION

A variety of public key cryptography protocols are known for encoding information, authenticating entities to one another, and electronically signing messages. Examples of such protocols include RSA, El Gamal, Schnorr and Fiat Shamir. A common feature of public key cryptography protocols is the fact that they employ large prime numbers, with typical lengths in the range of 512–2048 bits, to form one or more keys of the protocol. Some of these cryptosystems, such as RSA for example, require the random generation of several distinct prime numbers. Thus, generating prime numbers is an essential tool in public-key cryptography.

When efficiency is not a concern, one of the simplest ways to generate a random prime number is to select a random number q, and test it for primality. If the test is unsuccessful, the value for q is incremented by one, and the test is rerun. Since all prime numbers except two are odd, a straightforward improvement on this technique is to chose q as an odd value, and to update it in increments of two for each successive iteration of the test. However, this technique can become computationally intensive and is therefore not practical in a number of situations when large-sized numbers are employed.

To facilitate the random number selection process, several techniques have been developed that make it possible to more efficiently calculate the greatest common denominator of two numbers, and thereby determine whether they are co-prime. Examples of these techniques include Binary GCD, Extended GCD and the Lehmer formula. While these techniques exhibit excellent asymptotic complexity for numbers of extremely large size, they are difficult to program in an environment having limited processing resources, such as a smart card or other portable electronic device. In addition, they provide relatively poor performance for operations involving numbers of the size typically employed in the smart-card environment, e.g. in the range of 512 to 1024 bits. To increase the performance, it is possible to equip the card with an arithmetic coprocessor to carry out some of the operations of the primality test. However, other operations that are performed as part of the test, such as parity checking and binary shifts, are not compatible with the functionality typically offered in an arithmetic coprocessor. As a result, the overall performance still suffers.

To address these issues, an improved technique for generating random prime numbers is disclosed in commonly assigned application Ser. No. 09/818,658, the contents of which are incorporated herein by reference. Briefly, the method disclosed in this application comprises an algorithm that receives, as input, the values $\pi$ and $\lambda$, where $\pi = \Pi p_1$ is the product of a set of k distinct primary numbers $p_1$, and $\lambda$ is the Carmichael function and is defined as:

$$\lambda = LCM(\lambda(p_1), \ldots, \lambda(p_k)) \text{ and } \lambda(p_i) = p_i - 1,$$

in which LCM designates the least common multiple. The output of the algorithm comprises a random element x of the set $(Z/\pi Z)^*$ with uniform distribution. The algorithm essentially comprises the following steps:
1. Select a random number $x < \pi$ with uniform distribution;
2. Calculate $x^\lambda (\bmod\, \pi)$, and if this value equals 1 return x;
3. Otherwise, $x = x+1$ and loop back to step 2.

It is an object of the present invention to improve upon the technique disclosed in the prior pending application. In particular, that technique requires, on average, $\lambda/\phi(\pi)$ modular exponentiations, modulo $\pi$, with the exponent $\lambda$, where $\phi(\pi) = \Pi^k_{i=o} p_i - 1$. It is the objective of the present invention to reduce the time necessary to carry out these arithmetic operations.

SUMMARY OF THE INVENTION

The present invention generates a random number x that is co-prime with $\pi = \Pi p_1$, without having to calculate the greatest common denominator. To this end, the value for $\lambda = \lambda(\pi)$, where $\lambda$ is the Carmichael function, is calculated. Once calculated, this number is stored in memory for future use. Thereafter, the present invention comprises the following steps.
1. Choose a random number $x < \pi$ with uniform distribution;
2. Calculate $U = (1 - x^\lambda) \bmod \pi$;
3. If $U = 0$, return x;
4. Otherwise, choose a random value $r < \pi$ with uniform distribution;
5. $x = x + rU \bmod \pi$;
6. Proceed to step 2.

This procedure is very easy to implement in a coprocessor, since the algorithm only requires the programming of one exponentiation, one modular addition and one test of nullity, rather than more complex procedures.

Further features of the invention are explained in detail hereinafter, with reference to exemplary embodiments illustrated in the accompanying drawings.

DETAILED DESCRIPTION

To facilitate an understanding of the invention, it is described hereinafter with reference to its implementation in a smart card having a microprocessor. It will be appreciated, however, that the smart card is exemplary of a variety of different types of portable electronic devices for which the invention is particularly suited, and therefore this exemplary description should not be construed as limiting the invention in any manner.

In the implementation of public key cryptography protocols, such as the RSA algorithm, for example, it is necessary to select a pair of integer numbers p, q of given length that are co-prime with each other, for use in generating electronic keys for the protocol. To ensure that the selected numbers are co-prime with each other, a step of verifying co-primeness is performed. In the case of a portable electronic device with a microprocessor, such as a smart card, the test is performed within the card. Examples of tests for verifying the co-primeness are set forth, for example, in IEEE P1363 standard for public-key cryptography, and in ISO/IEC WD 18032 working draft of Apr. 18, 2001.

In practice, in the RSA protocol, confidentiality of the keys is ensured when the two integer numbers p and q are prime with each other and have a fixed length, for example, 512 or 1024 bits each. Typically, one of the two numbers q is an integer number that is selected in advance from amongst a set of numbers stored in the microprocessor card. The other number p is generated in a random fashion by the microprocessor card when the protocol is to be executed. For this purpose, the microprocessor card has a random number generator that is capable of supplying an integer number of the requisite size.

Figure 1:
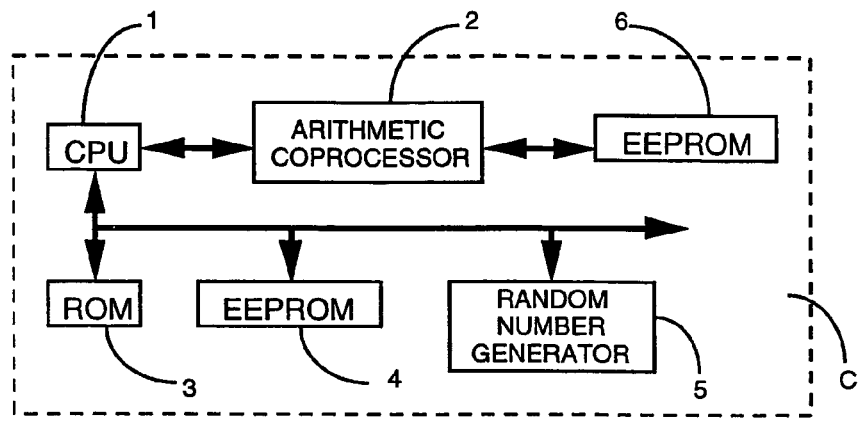
FIG. 1 is a block diagram of a portable electronic device, such as a smart card, in which the present invention can be implemented.

FIG. 1 is a block diagram of an exemplary smart card within which the present invention can be implemented. The card has a central processing unit 1, program memories 3 and 4, and a working memory (not shown) associated with the central processing unit 1. The card has a math coprocessor 2 that is capable of performing modular exponentiation calculations. Examples of suitable coprocessors that can be employed for this purpose include ST Microlock Electronics Model ST16CF54 and Phillips Model 83C852/5. The card also includes a random number generator 5.

The present invention provides a random number x that is co-prime with $\pi = \Pi p_i$, without having to calculate their greatest common denominator. To this end, the value of $\lambda = \lambda(\pi)$, were $\lambda$ is the Carmichael function, is first calculated. Once calculated, this value is preferably stored as an input to the random number selection algorithm so that it need not be repeatedly calculated each time a new number is to be provided. Once this value has been calculated, the random number is provided according to the following algorithm, which is depicted in the flow chart of FIG. 2.

At step 10, a number $x<\pi$ is randomly chosen with uniform distribution, using the random number generator 5. In step 20, the value $U=(1-x^\lambda) \mod \pi$ is calculated. In step 30, a determination is made whether U=0. This condition will occur if, and only if, $x^\lambda = 1 \pmod \pi$, which will happen if, and only if, x is coprime with $\pi$. Thus, for some random x, if U happens to be zero, then x is already coprime with $\pi$, and the search is complete. In this case, the value of x is returned as the randomly selected co-prime number, at step 40.

If U is not equal to zero, a number $r<\pi$ is randomly chosen with uniform distribution at step 50, again using the random number generator. The product of this number and U is calculated to generate an update factor. Then, in step 60, a determination is made whether the update factor $rU(\mod \pi)$ is equal to zero. When rU (mod $\pi$) does not equal zero, the value for x is changed to $x+rU \pmod \pi$ at step 70. The process then returns to step 20. If $rU(\mod \pi)$ equals zero at step 60, the process returns to step 50, to select a new value for r. The reason for making this determination is that if $rU(\mod \pi)$ happens to be zero, which can occur even if $r \approx 0$ and $U \approx 0$, the correction at step 70 will be useless, as the same value for U will be computed twice. Hence, a check is made to be sure the correction step will be meaningful before it is undertaken.

A particular advantage of this procedure is that it can be readily implemented by means of a math coprocessor. In essence, the programming for the coprocessor only requires one exponentiation, one modular addition, and one test of nullity, thereby minimizing the resources and effort required to implement the algorithm.

Another advantage resides in the fact that the algorithm is self-correcting. Once a value for x is selected that is co-prime with some factor of $\pi$, it remains co-prime with this factor after the updating step 70.

Figure 3:
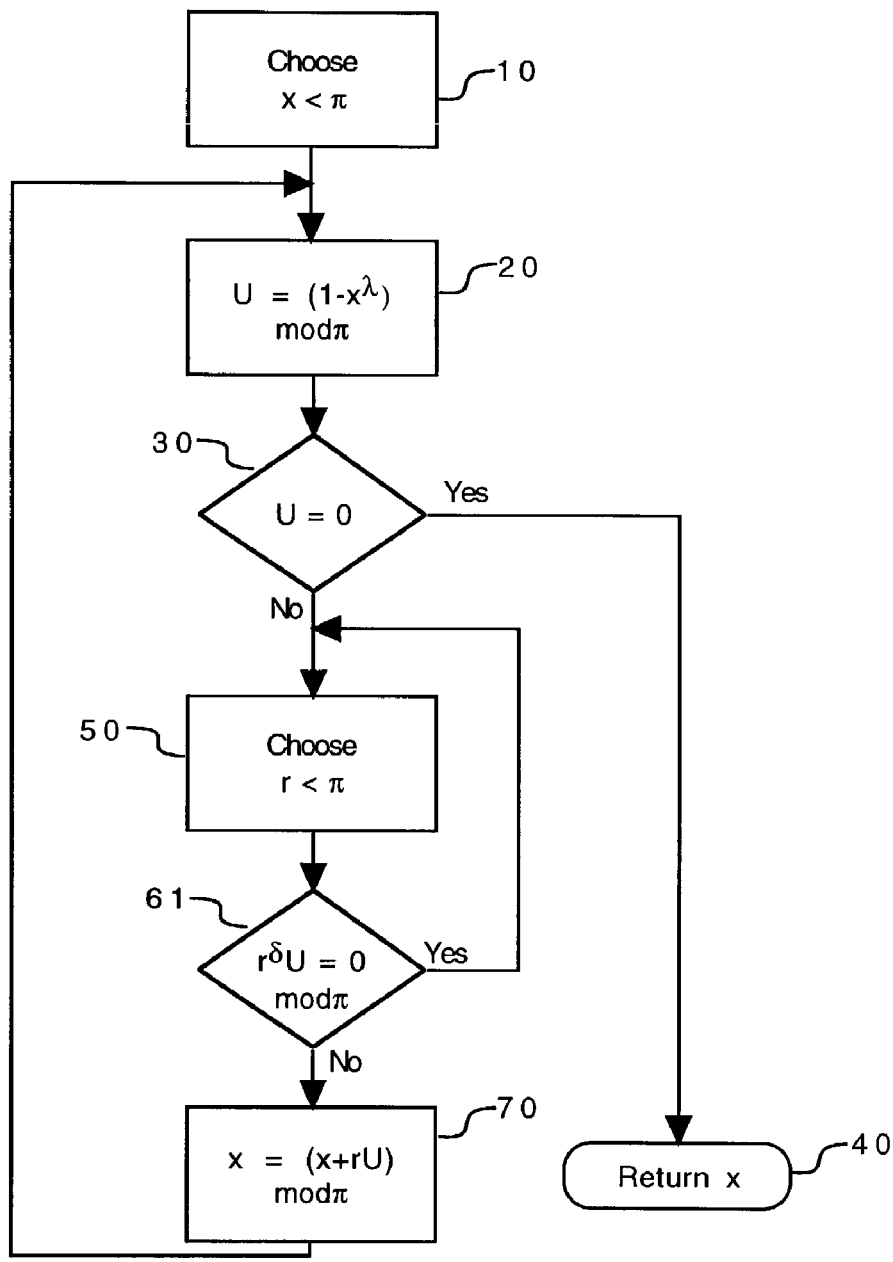
FIG. 3 is a flow chart illustrating a second embodiment of the invention.

Various alternatives can be employed to provide desirous results. One such alternative is illustrated in the flow chart of FIG. 3. In this example, the set of numbers $\pi$ is defined as $\pi = \Pi p_i^{\delta_i}$, where the values for $\delta_i$ are all positive. With reference to FIG. 3, the algorithm then proceeds as shown, where $\delta$ represents the maximum value for $\delta_i$.

Figure 2:
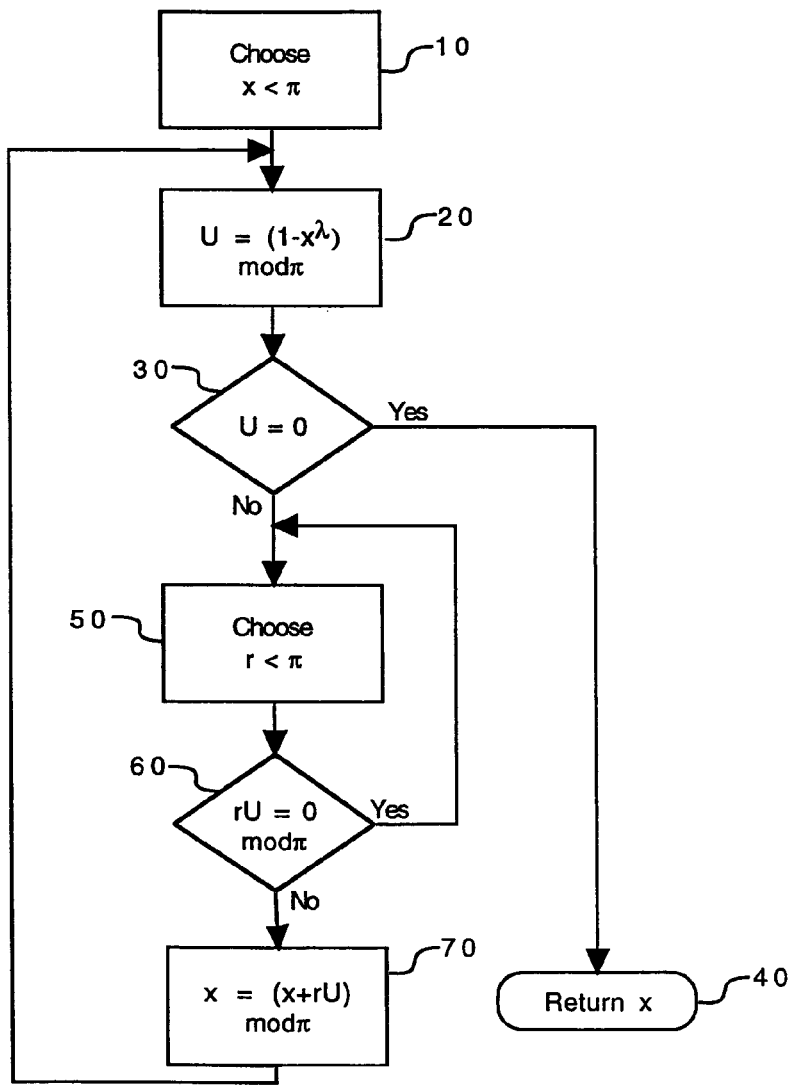
FIG. 2 is a flow chart illustrating a first exemplary embodiment of the invention.

Steps 10–50 are the same as those depicted in the flow chart of FIG. 2. At step 61, the value for $r^\delta U(\mod \pi)$ is calculated, and a determination is made whether it is equal to zero. If so, the process returns to step 50, and if not it proceeds to step 70, where it operates as in the example of FIG. 2.

Figure 4:
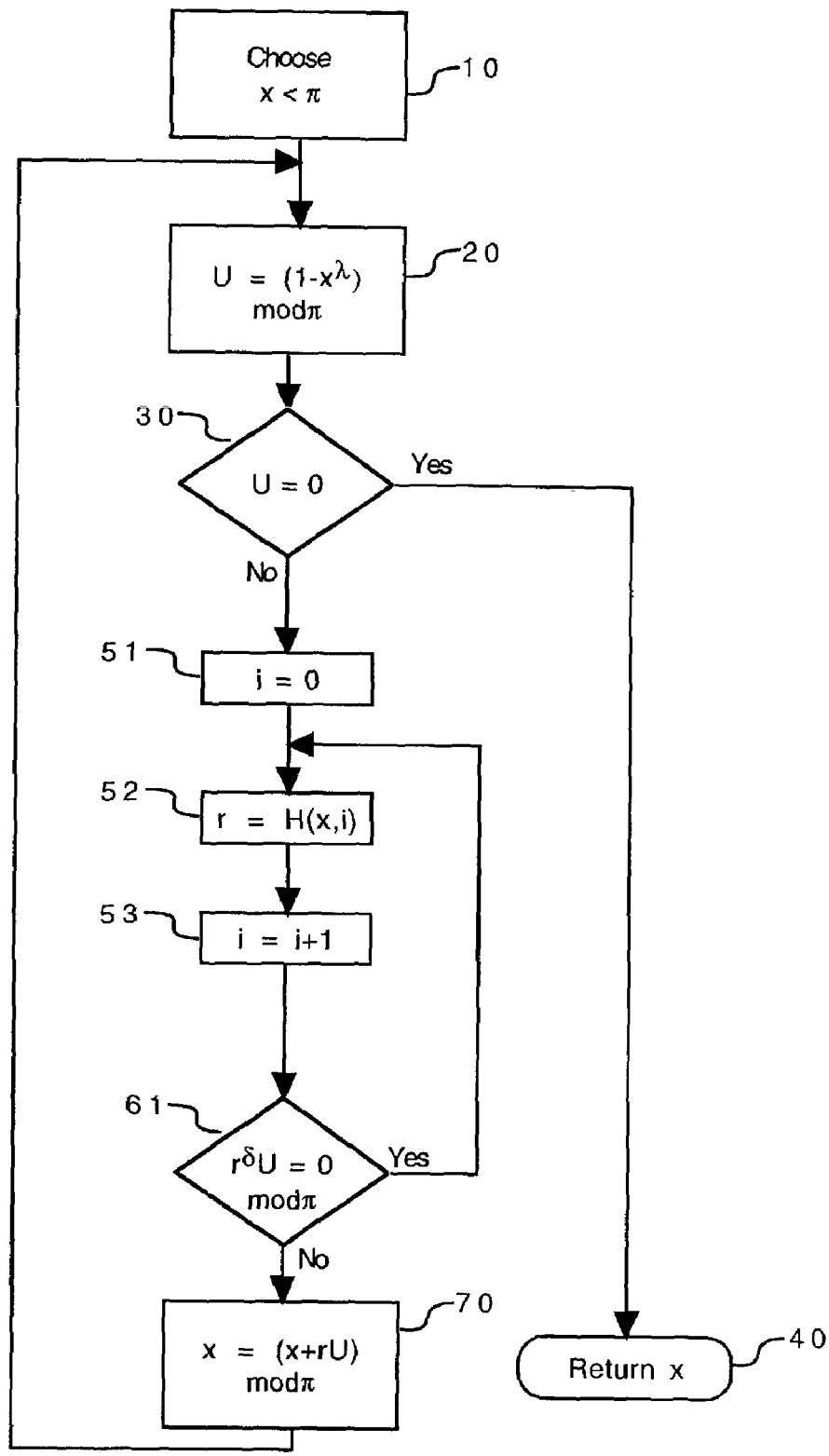
FIG. 4 is a flow chart illustrating a third embodiment of the invention.

In a further variant of this embodiment, a hashing function can be used to limit the generation of random numbers as inputs for the algorithm. Referring to FIG. 4, steps 10–40 remain the same as the embodiment of FIG. 3. If U is not equal to zero, at step 51 an index i is set to zero, and at step 52 the value r is calculated r=H(x, i), where H represents a hash function. In step 53, the index i is incremented, and a determination is then made at step 61 whether $r^\delta U(\mod \pi) = 0$. If so, the process returns to step 52 to calculate a new value for r. If not, the value for x is set as $x=x+rU(\mod \pi)$, and the procedure returns to step 20. With this variant, it is only necessary to make one call to the random number generator 5 each time that a value for p is needed.

From the foregoing, therefore, it can be seen that the present invention provides a procedure for generating random numbers that are co-prime with the set of the k smallest prime numbers, modulo $\pi$, without the need to calculate their greatest common divisor. As a result, the speed of execution is greatly increased.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method performed on a portable electronic device for generating a random number that is co-prime with a set of prime numbers $p_i$, comprising the following steps:
   (i) calculating the value $\lambda = \lambda(\pi)$, where $\lambda$ is the Carmichael function and $\pi = \Pi p_i$;
   (ii) Selecting a random value $x<\pi$;
   (iii) Determining whether $U=(1-x_\pi) \mod \pi$ is equal to zero;
   (iv) Repeating from step (iii) with a new value of x, if U does not equal zero, until U=0;
   (v) Using the generated random number x as a key in a cryptographic process when U=0.

2. The method of claim 1, wherein the new value for x is determined by combining an update factor with a current value for x.

3. The method of claim 2 wherein said update factor is based upon a random number r.

4. The method of claim 3 wherein said update factor is the product of said random number r and U.

5. The method of claim 3 wherein said random number r is less than $\pi$.

6. The method of claim 3 wherein $\pi = \Pi p_i^{\delta_i}$, where $\delta_i$ is positive, and said update factor is calculated as $r^\delta U$, where $\delta$ is the maximum value for $\delta_i$.

7. The method of claim 2 wherein said update factor is determined by a hash function.

8. The method of claim 7 wherein said hash function is performed on x.

9. The method of claim 2 further including the step of determining whether said update factor is equal to zero, and combining said update factor with the current value for x only if it has a non-zero value, modulo $\pi$.

10. The method of claim 1, wherein the value for $\lambda$ is pre-calculated and stored in memory for use in said method.

11. A portable electronic device having stored therein a program which executes the following steps:
(i) calculating the value $\lambda = \lambda(\pi)$, where $\lambda$ is the Carmichael function and $\pi = \Pi p_1$,
(ii) selecting a random value $x < \pi$;
(iii) determining whether $U = (1 - x^\lambda) \mod \pi$ is equal to zero;
(iv) providing x as the generated random number when $U = 0$; and
(v) repeating steps (iii) and (iv) with a new value for x when U does not equal zero.

12. The portable electronic device of claim 11 further including an arithmetic coprocessor that performs steps (iii) and (iv).

13. The portable electronic device of claim 11 wherein the new value for x is determined by combining an update factor with a current value for x.

14. The portable electronic device of claim 13 wherein said program executes the further steps of determining whether said update factor is equal to zero, and combining said update factor with the current value for x only if it has a non-zero value, modulo $\pi$.

15. The portable electronic device of claim 11 further including a memory storing the calculated value for $\lambda$ for use during each execution of said program.

* * * * *